Patented Oct. 27, 1931

1,829,270

UNITED STATES PATENT OFFICE

SAMUEL J. FOGELSON, OF CHICAGO, ILLINOIS

PHYSIOLOGICAL MUCIN PREPARATION

No Drawing.   Application filed December 18, 1930. Serial No. 503,236.

The present invention relates to a physiologically active mucin preparation and the process for preparing the same.

One of the objects of the invention is to produce an alkali-metal salt of mucin, suitable for internal administration as a medicine, particularly as antacid for the correction of hyperacidity of the human stomach; in which ailment the mucin preparation made in accordance with the present invention is particularly useful, in that it will combine with the excess acidity without rendering the stomach contents alkaline.

Another object of the invention is to treat natural mucin-containing substances with diverse reagents, consisting of acids and of alkalies, to eventuate what is believed to be a substantially normal sodium compound, or salt, of mucin.

Still another object of the invention is to treat the mucous derived from the stomachs of animals with hydrochloric acid to dissolve the mucin content thereof, to purify the resultant solution, to precipitate from the purified solution a comparatively pure form of mucin, and to convert the mucin into a sodium salt sufficiently pure to be administrable to human beings for curative and corrective purposes.

A further object of the invention relates to a method for precipitating gastric mucin from an acid mucous solution by adjusting the acidity (hydrogen-ion concentration) of the solution to a point where the mucin will be at the point of lowest solubility, whereby the mucin may be separated from other proteins and proteids, and recovered in a pure state; subsequently to be converted into the sodium compound.

Other objects of the invention will become apparent from the further description hereinbelow.

Mucin is one of the glyco-proteins, which are compounds of proteins and carbohydrates. It is characterized by containing acidic groups, which enable the preparation of salts of mucin, such as the sodium salt, and other analogous alkali-metal salts. A peculiar characteristics of gastric mucin is that it is soluble in dilute acids as well as in dilute alkalies. However, at a certain degree of acidity it is least soluble, and may hence be precipitated from solutions by adjusting their acidity to this point. Research work carried out by the present inventor has determined what this point is, and has led to the development of the process and product of the present invention.

It has been found that an acid solution of gastic mucin, when carefully neutralized by means of a weak alkali until the solution has a hydrogen-ion concentration equivalent to pH 4.5, will yield a precipitate of gastic mucin when the solution is admixed with alcohol, preferably equal volumes of alcohol and solution being employed. Under these circumstances, the said mucin will form a voluminous, genatinous precipitate, which can be separated from the mother liquor, as by decantation, and washed with water. The resulting washed product may then be treated with a sufficiency of acid sodium carbonate to bring its acidity down to actual neutrality, i. e. equivalent to pH 7.0, whereby a sodium compound, or salt, of said mucin will result. Such a salt is slightly soluble in water, but is soluble in acids. It is this salt that forms the desired end-point of the process of the present invention.

This sodium salt of gastric mucin is particularly efficacious when employed for the treatment of diseases of the stomach caused by, or aggravated by, hyperacidity; such as in the case of stomach, and of duodenal ulcers. It is a well-known fact that an excess of acid (hydrochloric acid) in the stomach greatly aggravates ulcerous conditions. Hence it follows that when the acidity of the stomach is reduced, relief from the diseased condition is attained. However, while the excess of acid in the stomach may be neutralized by ordinary alkalies, such as by sodium bicarbonate, magnesium hydroxide, calcium hydroxide or carbonate, and the like, the effect obtained is not satisfactory, as these neutralizing reagents will destroy all of the acidity, and, in the case of the water-soluble alkalies such as sodium bicarbonate, will actually render the contents of the stomach alkaline; thereby completely interrupting the digestion of proteid foods for the reason that pepsin will only peptize proteids in the presence of a small, but very necessary, amount of hydrochloric acid.

The gastric mucin salt prepared in accordance with the present invention, however, is by its nature so constituted that when it is brought into contact with the stomach contents containing more than the required small percentage of free hydrochloric acid, it will dissolve and at the same time neutralize a definite amount of acid.

When the acidity of the stomach has been brought down to a very low percentage, the gastric mucin compound of the present invention ceases to act and therefore cannot alkalinize the stomach contents, which latter would interfere with peptic digestion. A further marked advantage of the mucin salt is that by its very presence it inhibits the diffusion of pepsin and hydrochloric acid into the stomach from the linings thereof. The result is that the stomach contents are restored to their optimum acidity, so that any ulcers that may be present will not be further attacked by the digestive ferments in the stomach. The final result is very beneficial. Actual clinical tests with this new gastric mucin preparation have given highly gratifying results in the treatment of peptic ulcers. The preferred dosage is about one tablespoonful of the dry mucin salt, followed by further doses of about one gram of the salt at intervals of one hour. The efficacy of the mucin salt may be appreciated when it is stated that one gram of the preparation will combine with about fifteen cubic centimeters of one-half per cent. ($\frac{1}{2}\%$) hydrochloric acid. A further advantage of the new mucin salt is the fact that it is not at all acted upon by the ptyalin in the saliva, and hence can safely be administered per os, without the necessity of employing capsules or other means of introducing the mucin salt into the stomach.

As a workable exemplification of the manufacture of the new gastric mucin salt preparation on a commercial scale, the following process, employed when making the gastric mucin salt from freshly killed hogs, is described. Immediately after the hogs have been killed, their stomachs are removed, and the lining is stripped therefrom and thrown directly into a vat, such for example as a glass-lined tank, containing a 0.5% solution of hydrochloric acid. The linings are agitated in this solution, at room temperature, for a short time, which suffices to allow the mucin present to pass into solution. Considerable residue remains undissolved. The solution is separated from the insoluble matter either by decantation or filtration, preferably the latter. The clear filtered solution is then treated with small quantities of sodium carbonate, carefully introduced, until the solution has been reduced in acidity to a hydrogen-ion concentration equivalent to pH 4.5, which is the point at which the free mucin is least soluble; this point usually being spoken of as the iso-electric point of the compound. The solution is tested during the neutralization, preferably by electrometric titration, so as to insure the accurate adjustment of the solution to the desired degree of hydrogen-ion concentration. After the solution has been neutralized to an acidity corresponding to pH 4.5, it is mixed with an equal volume of a water-soluble organic solvent such as acetone or alcohol; ethyl alcohol being the preferred substance for this purpose. There will form, by the addition of the alcohol, a voluminous, gelatinous precipitate of the free gastric mucin.

After the precipitation, the mixture is allowed to stand for a short time to allow the precipitated mucin to settle, after which the supernatant fluid is decanted, and the mucin washed repeatedly with fresh cold water, in order to remove the soluble impurities and the sodium chloride that had been formed by the neutralization of the acid solution by the sodium carbonate, as well as any residual acidity, which at pH 4.5 is quite appreciable.

After the free mucin precipitate has been washed from three to four times with water, by decantation as aforesaid, the residual mucin precipitate is treated with water and/or sodium acid carbonate, whereby the latter will combine with the free mucin to form a sodium salt of the latter. The reaction is accompanied by evolution of gaseous carbon dioxide derived from the sodium bicarbonate. The sodium bicarbonate is added slowly and intermittently, care being taken to use only enough to yield a final sodium mucin compound that has a neutral reaction; that is to say one that has a hydrogen-ion concentration of pH 7.0. The finished product is then separated from the water by decantation and draining of the mucin salt, which is then transferred to glass, porcelain, or non-rusting metallic pans in which it is dried at a low temperature under vacuum until dry. The product is then sufficiently friable to permit of powdering, and is pulverized in any suitable manner, such as by grinding it in a porcelain-ball ball-mill. After sifting to insure uniformity, the product is ready for use in the medicinal arts for the purposes already hereinabove discussed.

While the hog stomachs yield the largest amount of gastric mucin, the present invention is not limited to the same, for the said mucin salt may also be made from mucous matter removed from the stomachs of other animals such as sheep, cattle and the like. Because the hog is however not a ruminant, its stomach contains more of the desirable gastric mucin complexes, and is hence to be preferred for the purposes of the present invention.

While hydrochloric acid has been described as the acid used in practice, it may be stated that other mineral acids, such as dilute sulfuric acid, phosphoric acid, nitric acid, or organic acids such as acetic acid may be used for the treatment of the lining of the animal stomachs in the first step of the above process. Also, while sodium salts have been described, the invention is not limited thereto, as known equivalents for the sodium salts are the potassium salts and lithium salts; and for some purposes the lithium salt may be employed. For economic reasons, however, the sodium salt is the most desirable. The salts of gastric mucin and the alkaline earths are not quite as suitable, because the mucin compounds thereof are not as readily soluble in the stomach fluids as are the alkali salts, such as the sodium salt.

What is desired to protect by Letters Patent is:

1. A physiologically active gastric mucin preparation comprising a substantially neutral alkali metal compound of the said mucin.

2. A physiologically active gastric mucin preparation comprising a substantially neutral sodium compound of the said mucin.

3. As an antacid for the treatment of peptic ulcers, an alkaline metal salt of gastric mucin.

4. A physiologically active gastric mucin preparation consisting of gastric mucin in which at least one of the acidic groups has been neutralized by an alkali.

5. The process of preparing a mucin compound which comprises extracting mucin from animal stomach linings by means of an acidified aqueous medium, filtering the solution thus obtained, adjusting the acidity of the filtrate to the iso-electric point of the mucin therein contained, and precipitating the mucin therefrom by admixing the filtrate with substantially an equal volume of a neutral water-soluble organic fluid.

6. The process as defined in claim 5 wherein the organic fluid is alcohol.

7. The process as defined in claim 5 wherein the organic fluid is acetone.

8. The process of preparing a mucin compound which consists in extracting the linings of animal stomachs with an aqueous solution acidified with a mineral acid, filtering the resulting solution, adjusting the hydrogen-ion concentration of the filtrate to the iso-electric point of the therein contained mucin, precipitating the mucin by admixing the filtrate with substantially an equal volume of a water-miscible alcohol, washing the precipitated mucin by decantation to remove soluble impurities therefrom, and thereupon treating said mucin in the presence of water with a soluble alkali salt capable of combining therewith to form a mucin salt of the alkali, and drying and pulverizing the salt thus formed.

9. The process of preparing a mucin compound which consists in treating the linings of animal stomachs with an aqueous solution of hydrochloric acid to eventuate an acid solution of mucin, filtering said solution and partially neutralizing the same with an alkali carbonate until the solution has a hydrogen-ion concentration of substantially equivalent to a pH 4.5, thereafter mixing said partially neutralized filtrate with an equal volume of ethyl alcohol whereby mucin will be precipitated as a gelatinous precipitate, washing said precipitate with water by decantation to remove soluble impurities therefrom, suspending said precipitate in water and treating the same with sodium acid carbonate until the reaction of the precipitate and suspending water is substantially pH 7.0, and thereafter separating said precipitate from the suspension, and drying and pulverizing the same.

10. The process as defined in claim 9, wherein the stomachs are those of hogs, and the neutralizing alkali is sodium carbonate.

In witness whereof, I have hereunto subscribed my name.

SAMUEL J. FOGELSON.

CERTIFICATE OF CORRECTION.

Patent No. 1,829,270.  Granted October 27, 1931, to

SAMUEL J. FOGELSON.

It is hereby certified that error appears in the printed specification of the above numbered patent requiring correction as follows: Page 1, line 36, before "mucin" insert gastric; line 49, for "characteristics" read characteristic; line 68, for "genatinous" read gelatinous, and line 75, for "said" read the; and that the said Letters Patent should be read with these corrections therein that the same may conform to the record of the case in the Patent Office.

Signed and sealed this 15th day of December, A. D. 1931.

(Seal)

M. J. Moore,
Acting Commissioner of Patents.